United States Patent
Lechner et al.

(10) Patent No.: US 8,554,613 B2
(45) Date of Patent: Oct. 8, 2013

(54) PROVIDING COUPONS BASED ON USER SELECTED PREFERENCE OPTIONS

(75) Inventors: Marcelo D. Lechner, Burlington, MA (US); Siddharth Chitnis, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/278,575

(22) Filed: Oct. 21, 2011

(65) Prior Publication Data

US 2013/0103480 A1    Apr. 25, 2013

(51) Int. Cl.
   *G06Q 30/00* (2012.01)
(52) U.S. Cl.
   USPC ............... 705/14.25; 705/14.1; 705/14.19
(58) Field of Classification Search
   USPC ............................................. 705/14.25
   See application file for complete search history.

(56) References Cited

U.S. PATENT DOCUMENTS

| | | | |
|---|---|---|---|
| 7,593,871 B1* | 9/2009 | Mesaros | 705/26.2 |
| 2007/0121843 A1* | 5/2007 | Atazky et al. | 379/114.13 |
| 2010/0185504 A1* | 7/2010 | Rajan et al. | 705/14.13 |

OTHER PUBLICATIONS

Kauffman et al., "New Buyers' Arrival Under Dynamic Pricing Market Microstructure: The Case of Group-Buying Discounts on the Internet", Proceedings of the 34th Hawaii International Conference on System Sciences, IEEE, Jan. 2001.*

* cited by examiner

*Primary Examiner* — John G Weiss
*Assistant Examiner* — Scott C Anderson

(57) ABSTRACT

A device is configured to receive, from a first mobile device of a first user of a group of users, information identifying a first location of the first mobile device and to receive, from a second mobile device of a second user of the group, a second location of the second mobile device. The device is further configured to determine a geographic area of a venue associated with a coupon. The device is also configured to match the coupon to the group when the first location and the second location are within the geographic area, and transmit information associated with the matched coupon to the first mobile device and the second mobile device. The group is organized by the first user or the second user for a plurality of users to receive coupons for a particular type of service associated with the matched coupon.

23 Claims, 6 Drawing Sheets

PROVIDING COUPONS BASED ON USER SELECTED PREFERENCE OPTIONS

BACKGROUND

Coupon services currently provide coupons for various services, products, etc. to potential customers online via, for example, dedicated websites of the companies, email, online advertisements, etc. The coupon services often provide coupons that are targeted based on a permanent location associated with a user. For example, certain coupon services provide coupons, to a user, based on a location of the user when the user is accessing a dedicated website that is providing the coupons. The coupon services are unable to take into account that users may move to different locations, at different times, which are associated with various coupons. The users are unlikely to proactively seek out coupons online at the different times. Furthermore, a single coupon is often an offer for multiple people, such as a coupon for dinner for four people, at a particular restaurant, for a particular price, and during a particular day. A user who is traveling may forego such a coupon because the user is unaware that the user's contacts are in the same geographic area as the user and would also be interested in enjoying the offer with the user.

DETAILED DESCRIPTION OF PREFERRED EMBODIMENTS

The following detailed description refers to the accompanying drawings. The same reference numbers in different drawings may identify the same or similar elements.

An implementation, described herein, may provide coupons to users who move to different geographic locations. For example, a user may register for a catch-up service by specifying information associated with a mobile device of the user, preferences of the user, and/or contacts of the user. A server, associated with the catch-up service, may receive, from the mobile device, information identifying a location of the mobile device. The server may identify coupons for the user based on the location, one or more of the contacts of the user that are within a geographic area associated with the location, and/or the preferences of the user. The server may transmit information associated with one or more of the identified coupons to the mobile device and/or to mobile device(s) of the contacts of the user that are within the geographic area. As a result, the user who traveled to the location is able to take advantage of the coupon(s) with one or more of his contacts.

Figure 1:
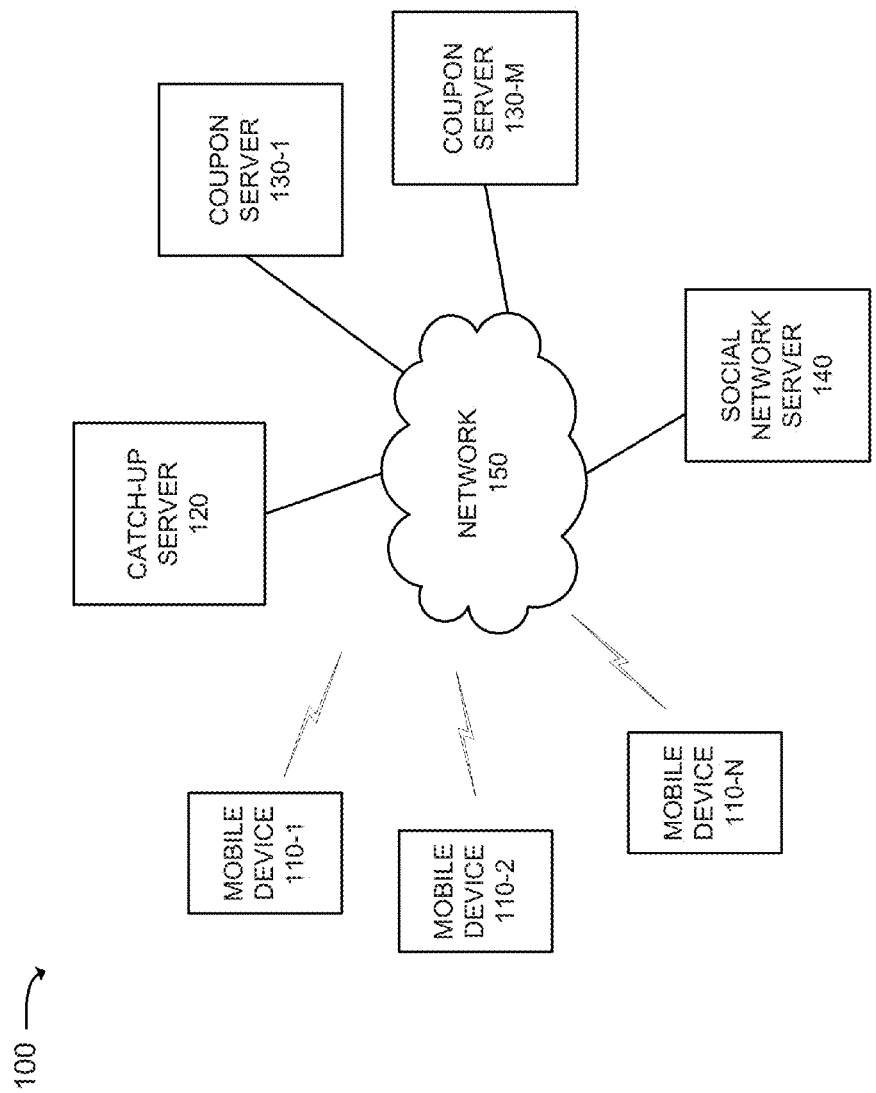
FIG. 1 is a diagram of an example environment in which systems and/or methods described herein may be implemented.

FIG. 1 is a diagram of an example environment 100 in which a system and/or method described herein may be implemented. As shown in FIG. 1, environment 100 may include one or more of the following components: mobile devices 110-1, 110-2, . . . , 110-N (where N≥1) (collectively referred to as "mobile devices 110" and individually as "mobile device 110"); a catch-up server 120; coupon servers 130-1 . . . 130-M (where M≥1) (collectively referred to as "coupon servers 130" and individually as "coupon server 130"); social network server 140; and a network 150. Three mobile devices 110, one catch-up server 120, two coupon servers 130, one social network server 140, and one network 150 have been illustrated in FIG. 1 for simplicity. In practice, there may be additional or fewer mobile devices 110, catch-up servers 120, coupon servers 130, social network servers 140, and networks 150. Also, in some implementations, one or more of the components of environment 100 may perform one or more functions described as being performed by another one or more of the components of environment 100.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Mobile device 110 may include any computation or communication device, such as a communication device that is capable of communicating with catch-up server 120 via network 150. In one implementation, mobile device 110 may take the form of a smart phone, a personal digital assistant (PDA), a mobile telephone device, a handheld computer, a personal media player, etc. In another implementation, mobile device 110 may take the form of a laptop computer or any other mobile computer device capable of transmitting and/or receiving data. Mobile device 110 may store contacts, such as identifiers of people associated with the user. In one example, mobile device 110 may transmit a signal (e.g., a global positioning system (GPS)) identifying a geographic location of mobile device 110, to catch-up server 120. In response, mobile device 110 may receive information about coupons from catch-up server 120, and may display a representation of the information about the coupons.

Catch-up server 120 may represent a single server device or a collection of multiple server devices and/or computer systems. In one implementation, catch-up server 120 may register users of mobile devices 110 for a catch-up service provided by catch-up server 120. Additionally, or alternatively, catch-up server 120 may facilitate the catch-up service by, for example, receiving information about coupons from coupon servers 130; determining locations of mobile devices 110 of users that are registered for the catch-up service; and transmitting information about one or more of the coupons to mobile devices 110 of users within one or more groups.

Coupon server 130 may represent a single server device or a collection of multiple server devices and/or computer systems. In one implementation, coupon server 130 may provide coupons for various services (e.g., food-related services, entertainment services, etc.), products, etc. In one example, coupon server 130 may provide a coupon that is valid for a particular period of time (e.g., 24 hours). An operator of coupon server 130 may provide the coupons based on request(s) from and/or arrangement(s) with providers of the services, sellers of the products, intermediary third parties, etc. Coupon server 130 may transmit information about available coupon(s) to catch-up server 120.

Social network server 140 may represent a single server device or a collection of multiple server devices and/or computer systems. In one implementation, social network server 140 may provide a social networking service to users of mobile devices 110. Social network server 140 may indicate connection(s) between a user of mobile device 110 and one or more other users, including friends of the user, professional associates of the user, family members of the user, acquaintances of the user, etc. The user may a website/dedicated application, provided by social network 140, to establish new connections with additional users of mobile devices 110 that are registered for the catch-up service.

Network 150 may include a single network, multiple networks of a same type, or multiple networks of different types. For example, network 150 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network (PSTN) or a cellular network), a subset of the Internet, an ad hoc network, a fiber optic network (e.g., a fiber optic service (FiOS) network), or any combination of the aforementioned networks.

Figure 2:
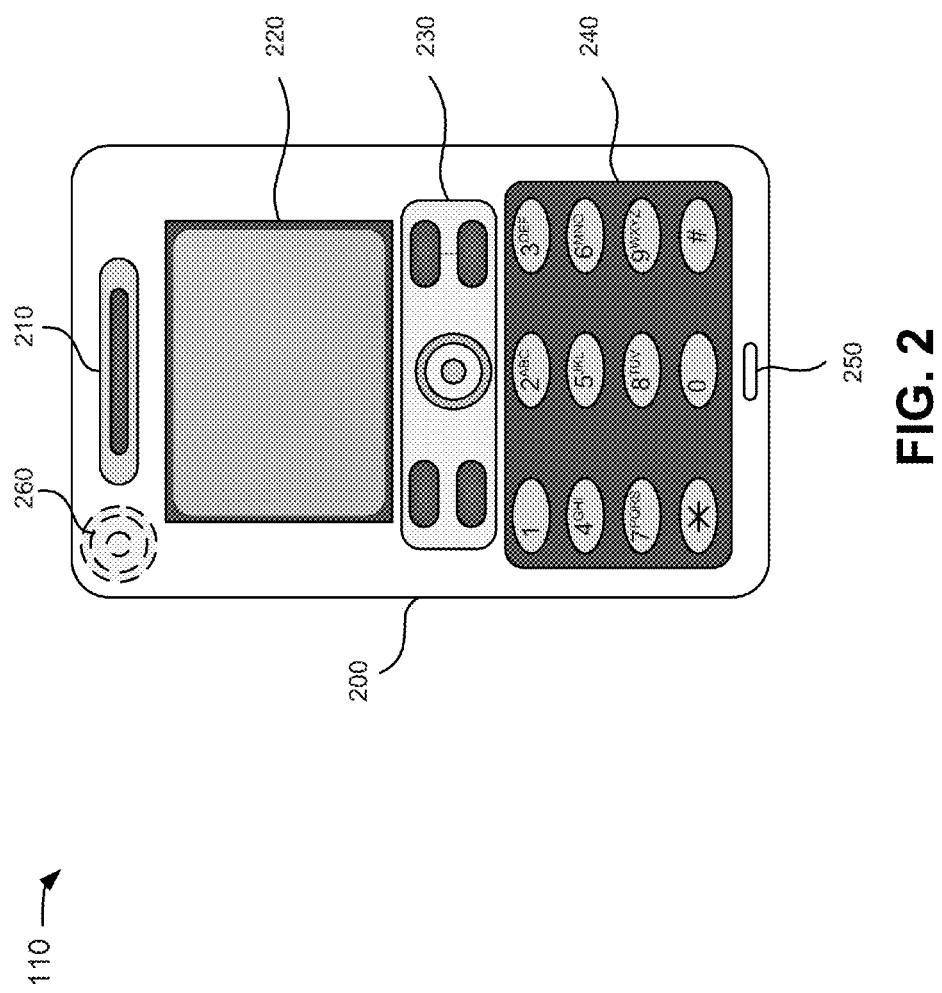
FIG. 2 is a diagram of example components of a mobile device of FIG. 1.

FIG. 2 is a diagram of example components of mobile device 110. As shown in FIG. 2, mobile device 110 may include a housing 200, a speaker 210, a display 220, control buttons 230, a keypad 240, a microphone 250, and/or a camera 260. Housing 200 may include a chassis on which some or all of the components of mobile device 110 are mechanically secured and/or covered. Speaker 210 may include a component to receive input electrical signals from mobile device 110 and transmit audio output signals, which communicate audible information to a user of mobile device 110.

Display 220 may include a component to receive input electrical signals and present a visual output in the form of text, images, videos and/or combinations of text, images, and/or videos which communicate visual information to the user of mobile device 110. In one implementation, display 220 may display text input into mobile device 110, text, images, and/or video received from another device, and/or information regarding incoming or outgoing calls or text messages, emails, media, games, phone books, address books, the current time, etc.

Control buttons 230 may include one or more buttons that accept, as input, mechanical pressure from the user (e.g., the user presses a control button or a combination of control buttons) and may send electrical signals to processing unit 320 that may cause mobile device 110 to perform one or more operations. For example, control buttons 230 may be used to cause mobile device 110 to transmit information. Keypad 240 may include a standard telephone keypad, keyboard, or another arrangement of keys. In an alternative implementation, keypad 240 may be presented as part of display 220.

Microphone 250 may include a component to receive audible information from the user and send, as output, an electrical signal that may be stored by mobile device 110, transmitted to another user device, or cause the device to perform one or more operations. Camera 260 may be provided on a front or back side of mobile device 110, and may include a component to receive, as input, analog optical signals and send, as output, a digital image or video that can be, for example, viewed on the display 210, stored in the memory of mobile device 110, discarded and/or transmitted to another mobile device 110.

Although FIG. 2 depicts example components of mobile device 110, in other implementations, mobile device 110 may contain fewer, additional, different, or differently arranged components than illustrated in FIG. 2. In one example, mobile device 110 may also include one or more components described below with reference to FIG. 3. In still other implementations, one or more components of mobile device 110 may perform one or more tasks described as being performed by one or more other components of mobile device 110.

Figure 3:
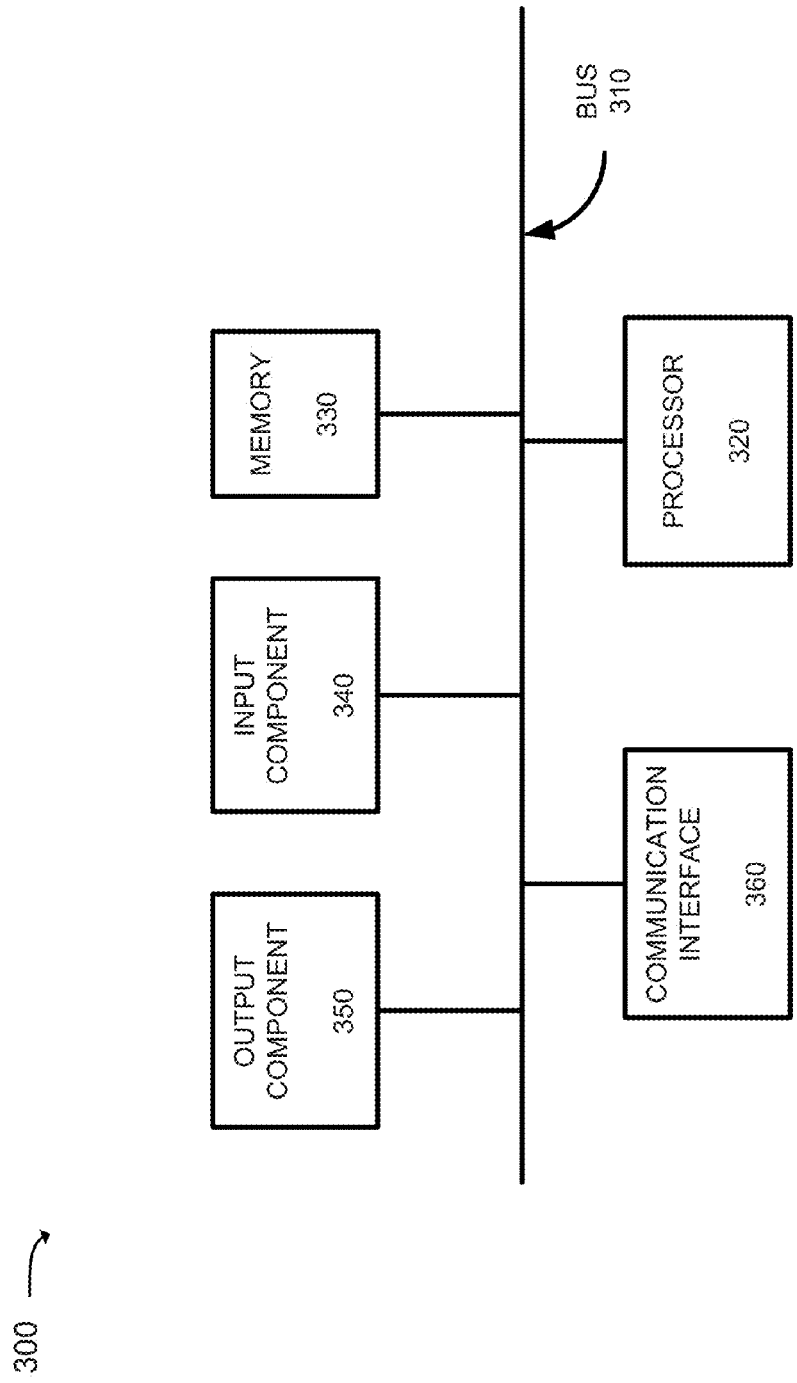
FIG. 3 is a diagram of example components of one or more of the devices of FIG. 1.

FIG. 3 is a diagram of example components of a device 300 that may be associated with mobile device 110, catch-up server 120, coupon server 130, and/or social network server 140. Each one of mobile device 110, catch-up server 120, coupon server 130, and/or social network server 140 may include one or more devices 300 and/or one or more of each one of the components of device 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path, or a collection of paths, that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include one or more input mechanisms that permit a user to input information to device 300. Output component 350 may include one or more output mechanisms that output information to the user. Examples of input and output mechanisms may include buttons (e.g., control buttons 230, keys of keypad 240 or a keyboard, a mouse, a joystick, etc.); a touch screen interface to permit data and control commands to be input into device 300; a speaker (e.g., speaker 210) to receive electrical signals and output audio signals; a microphone (e.g., microphone 250) to receive audio signals and output electrical signals; a display (e.g., display 220) to output visual information (e.g., web pages, transaction information, mobile pin pad interface, etc.); a vibrator to cause device 300 to vibrate; a camera (e.g., camera 260) to receive video and/or images; etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit them over the air, and receive RF signals over the air and provide them to communication interface 360. In one implementation, for example, communication interface 360 may communicate with network 150 and/or devices connected to network 150.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, etc.) or other forms of random access memory (RAM) or read only memory (ROM). A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
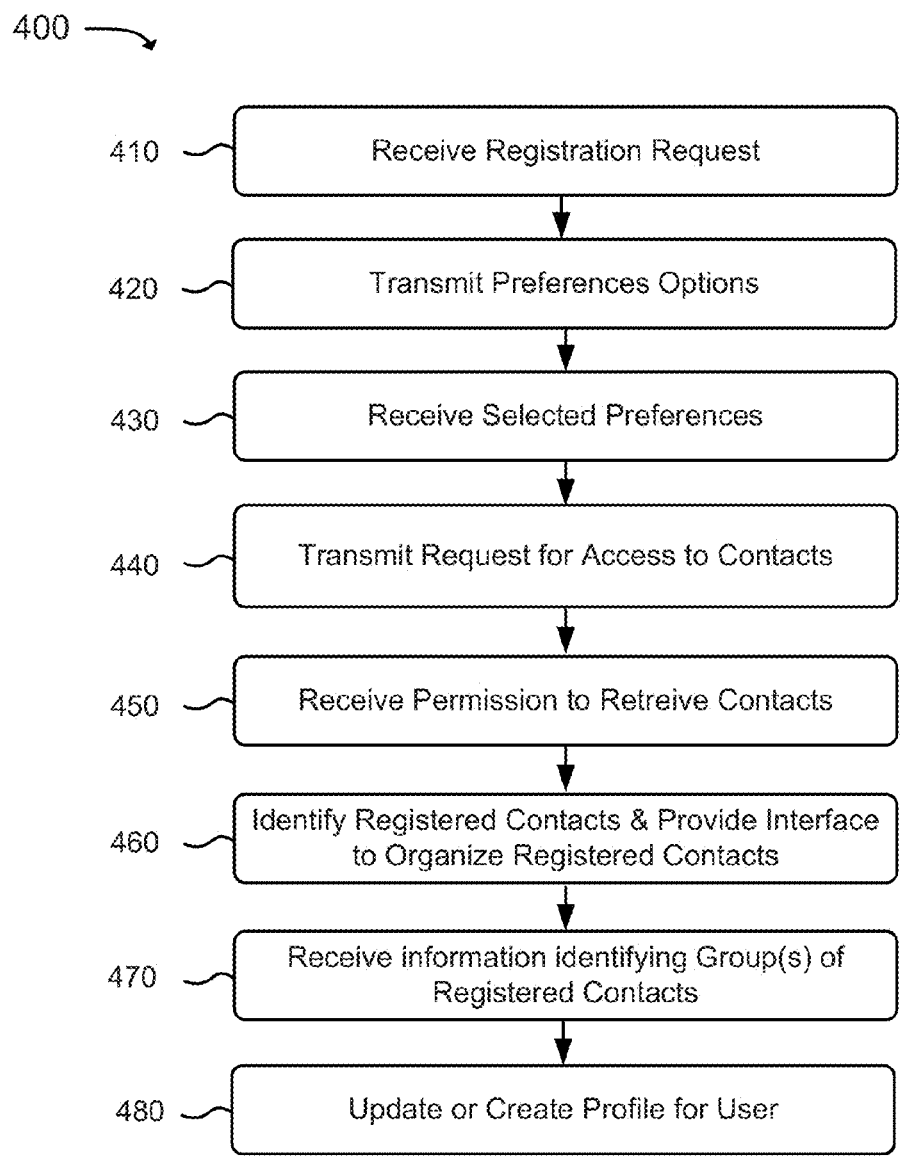
FIG. 4 is a flow chart of an example process for registering for a catch-up service.

FIG. 4 is a flow chart of an example process 400 for registering for a catch-up service. In one implementation, catch-up server 120 may perform process 400. In another implementation, a device or collection of devices separate from, or in combination with, catch-up server 120 may perform some or all of process 400. For example, mobile device 110 and/or social network server 140 may perform one or more of the operations described as being performed by catch-up server 120.

As shown in FIG. 4, process 400 may include receiving a registration request (block 410). In one implementation, a user may decide to register for a catch-up service provided by catch-up server 120. To register, the user may use mobile device 110 and/or another computing device (not shown in FIG. 1) to access a registration interface. In one example, the user may access the registration interface via (e.g., a catch-up application of) a social networking service provided by social network server 140. In another example, the user may access the registration interface via a dedicated catch-up website provided by catch-up server 120. In yet another example, the user may download a dedicated catch-up application to mobile device 110, and may access the registration interface before and/or during the download process and/or via the dedicated catch-up application. Thereafter, in one implementation, the registration interface may prompt the user to enter user information (e.g., a username, a password, telephone numbers associated one or more mobile devices 110 of the user, etc.). Catch-up server 120 may receive the entered user information as part of a registration request.

Process 400 may further include transmitting preferences options (block 420) and receiving selected preferences (block 430). For example, after receiving the registration request, catch-up server 120 may transmit options for preferences that may specify which types of coupons the user may be interested in being notified about in the future via the catch-up service. The options for the preferences may include, for example, a type of service (e.g., sports activities, bar-related activities, restaurant activities, etc.), a quantity of people (e.g., coupon is for 2-3 people, 3-5 people, 5 or more people, etc.), a period of time (e.g., coupon is for a day-time activity, a night-time activity, a lunch-time activity, a dinner-time activity, etc.), etc. The user may use mobile device 110 and/or the other computing device to select one or more of the preferences based on the options. Mobile device 110 and/or the other computing device may transmit the selected preferences to catch-up server 120. Catch-up server 120 may receive the selected preferences.

Process 400 may also include receiving a request for access to contacts (block 440) and receiving permission to retrieve contacts (block 450). For example, catch-up server 120 may transmit a request for access to contacts of the user. The contacts of the user may include contacts that are stored in mobile device 110 of the user and/or contacts of the user with which the user is connected to via one or more social networking services. In response to the request for access, the user may use mobile device 110 and/or the other computing device to provide permission for catch-up server 120 to retrieve contacts of the user from mobile device 110. Additionally, or alternatively, the user may use mobile device 110 and/or the other computing device to provide permission for catch-up server 120 to retrieve contacts of the user from one or more social networking services. The permission to retrieve contacts may include, for example, an identifier of a social network service and information necessary to retrieve the contacts from the social networking service (e.g., a username and a password used by the user for the social network service). Catch-up server 120 may receive, from mobile device 110 and/or the other computing device, the permission to retrieve the contacts.

Process 400 may also include identifying registered contacts and providing an interface to organize registered contacts (block 460). For example, based on the permission to retrieve the contacts, catch-up server 120 may retrieve the contacts of the user from mobile device 110 and/or from one or more social networking services. Thereafter, catch-up server 120 may identify which one or more of the retrieved contacts are also registered for the catch-up service. Catch-up server 120 may identify the registered contacts by, for example, determining whether a first name and a last name of a retrieved contact (and/or other identifying information) match corresponding information stored for any user of the catch-up service. Catch-up server 120 may provide an interface to mobile device 110 to organize the registered contacts. The interface may list all of the registered contacts. Additionally, catch-up server 120 may allow the user to send invitations to retrieved contacts of the user that were not identified as registered contacts to invite them to register for the catch-up service.

Process 400 may also include receiving information identifying group(s) of registered contacts (block 470). In one implementation, the user may use the interface to organize the listed registered contacts into one or more different groups. In one example, the user may create a different group for one or more preferences selected by the user. For example, the user may create a first group for sport activities, a second group for bar-related activities, a third group for nighttime activities, a fourth group for services that are provided on Sundays, etc. Two or more of the groups may include one or more of the same registered contacts of the user. In another example, the user may create a different group based on relationships of the registered contacts to the user. For example, the user may create a fifth group that includes friends of the user, a sixth group that includes family members of the user, etc. Catch-up server 120 may receive information identifying the organized groups of registered contacts from mobile device 110 and/or the other computing device, depending on which one is used to create the organized groups of registered contacts. Catch-up server 120 may require authorization of the registered contacts for the registered contacts to be included in particular group(s) organized by the user.

Process 400 may also include updating or creating a profile for the user (block 480). For example, catch-up server 120 may store profiles of different users. If catch-up server 120 does not store a profile for the user of mobile device 110, catch-up server 120 may create the profile. If catch-up server 120 already stores the profile for the user of user device 110, catch-up server 120 may update the profile based on new information provided by the user. The profile may include the user information associated with the user, information about mobile device 110 (e.g., a telephone number, an Internet Protocol (IP) address, a device identifier, etc.), information about the preferences of the user, and identifiers of groups of contacts organized by and/or associated with the user, and/or any other relevant information. Catch-up server 120 may retrieve the profile when catch-up server 120 determines a location of mobile device 110, as described further below with reference to FIG. 5. The user may use mobile device 110 and/or the other computing device to request and review information (e.g., the selected preferences) included in the profile of the user. The user may further use mobile device 110 to modify the profile, by using similar techniques to those described above with reference to process 400.

Figure 5:
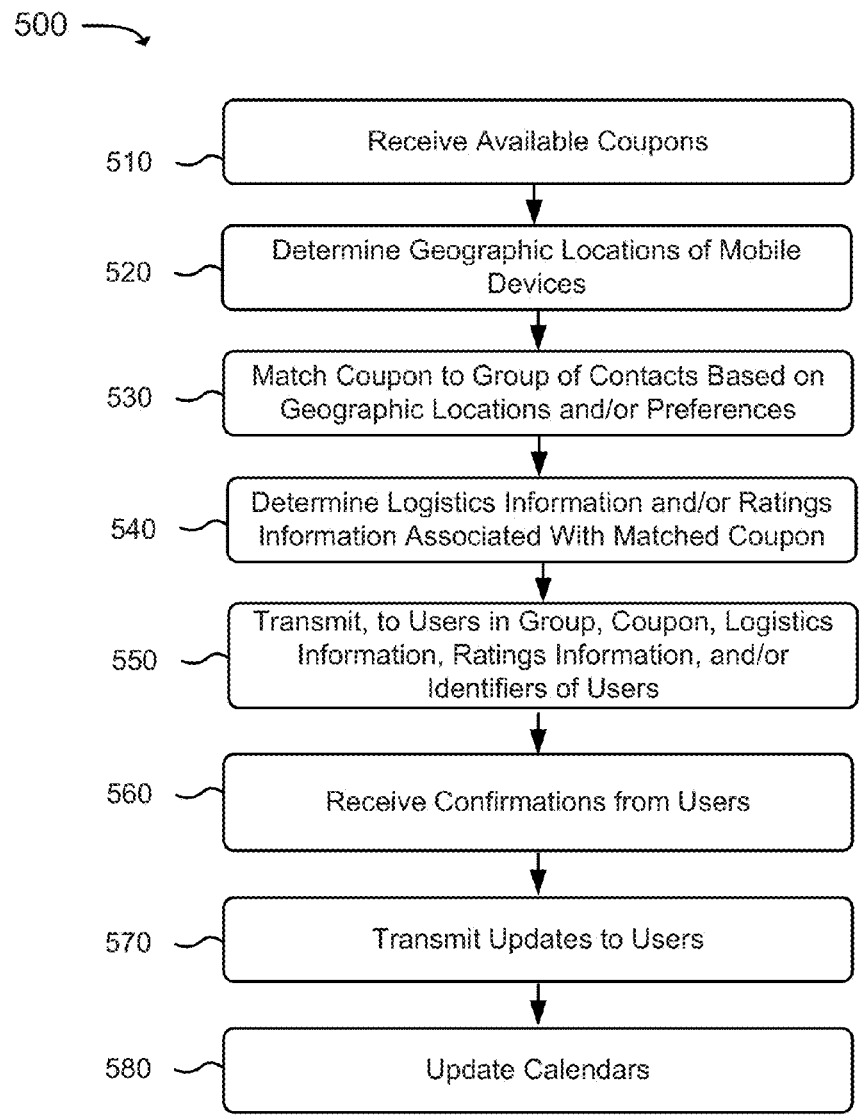
FIG. 5 is a flowchart of an example process for providing coupons.

FIG. 5 is a flowchart of an example process 500 for providing coupons. In one implementation, catch-up server 120 may perform process 500. In another implementation, a device or collection of devices separate from, or in combination with, catch-up server 120 may perform some or all of process 500.

As shown in FIG. 5, process 500 may include receiving available coupons (block 510). For example, catch-up server 120 may receive information about available coupons from coupon servers 130. In one implementation, catch-up server 120 may receive/retrieve the information about the available coupons periodically (e.g., every 24 hours). In another implementation, coupon server 130 may transmit particular information about an available coupon to catch-up server 120 after coupon server 130 receives and/or generates the particular information about the available coupon and/or before a time period, associated with the particular coupon, expires. For example, coupon server 130 may transmit a coupon, which is for a service of dinner at 6 PM on Sep. 10, 2011, 24 hours before the service, at 6 PM on Sep. 9, 2011, to catch-up server 120.

The information about the available coupons may include one or more of: a type of service associated with the available coupon (e.g., restaurant service), a type of activity associated with the available coupon (e.g., dinner), an identifier of a venue associated with the available coupon (e.g., Grande Mexican Restaurant), a geographic location of the venue (e.g., 1600 Pennsylvania Ave, Washington, D.C.), a geographic area associated with the venue (e.g., a name of a neighborhood (e.g., Foggy Bottom neighborhood in Washington, D.C.), a name of a city (Fairfax, Va.), and/or a zip code (e.g., 20037)), a time period associated with the available coupon (e.g., Friday, Oct. 7, 2011, 3:00-11:30 P.M.), a quantity of people required to use the available coupon (e.g., 2-8 people), discount and/or terms associated with the available coupon (e.g., 50% off, with the coupon, when customers spend more than $40.00 per person), etc. Additionally, or alternatively, catch-up server 120 may receive, from coupon servers 130, updates about coupons for which catch-up server 120 already stores information.

Process 500 may further include determining geographic locations of mobile devices (block 520) and matching a coupon to a group of contacts based on the geographic locations and/or preferences (block 530). For example, catch-up server 120 may determine geographic locations of mobile devices 110 of users who are registered for a catch-up service provided by catch-up server 120. In one implementation, mobile device 110 may include a GPS device. Catch-up server 120 may periodically (e.g., every 10 minutes), and/or whenever mobile device 110 moves to a new location, retrieve, from mobile device 110, information identifying a GPS location of mobile device 110 as the geographic location. Thereafter, catch-up server 120 may match one or more of the available coupons to a group of contacts based on the geographic locations and/or preferences of the users that are in the group of contacts. For example, catch-up server 120 may match an available coupon to a group of contacts when two or more users identified in the group of contacts are in the geographic area associated with the available coupon and when profiles of the two or more users indicate that the users are interested in receiving coupons for a type of service associated with the available coupon. Catch-up server 120 may determine the geographic area based on a geographic location of a venue associated with the available coupon (e.g., the venue where a service/activity, offered via the available coupon, is provided), which may be included in the information about the available coupon.

Process 500 may also include determining logistics information and/or rating information associated with the matched coupon (block 540). For example, after matching an available coupon to a group of contacts, catch-up server 120 may determine logistics information associated with the available coupon. The logistics information may include, for example, directions to a venue associated with the available coupon, transportation available to the venue, weather expected during a time period of an activity associated with the available coupon, etc. For example, catch-up server 120 may determine directions for users in the group and the venue based on the geographic locations of mobile devices 110 of the users and the geographic location of the venue. Additionally, or alternatively, catch-up server 120 may determine ratings information associated with the venue. The ratings information may include one or more ratings provided by other users, of the catch-up service, about the venue and/or one or more ratings retrieved from specialized services that rate and/or collect information about different venues.

Process 500 may also include transmitting, to users in the group, the coupon, logistics information, the ratings information, and/or identifiers of users (block 550). Catch-up server 120 may generate coupon information, and may transmit the coupon information to mobile devices 110 of the users, in the group, who are located in the geographic area associated with the available coupon and/or who are interested (e.g., based on preferences selected by the users) in receiving coupons for the type of service associated with the available coupon. The coupon information may include, for example, a portion of the information about the available coupons, the logistics information, the ratings information, and/or identifiers of the users within the group to whom the coupon information is being transmitted.

Process 500 may also include receiving confirmations from users (block 560). For example, mobile devices 110 may receive the coupon information. Mobile devices 110 may display information included in the coupon information. The users of mobile devices 110 may use mobile devices 110 to accept an offer of the available coupon by providing the confirmation. Accepting the offer may include confirming participation in the activity associated with the available coupon. Catch-up server 120 may receive confirmations from mobile devices 110 of one or more users.

Process 500 may also include transmitting updates to users (block 570) and updating calendars (block 580). In one implementation, catch-up server 120 may determine, after a particular period of time (e.g., 1 hour after transmitting the coupon information), a quantity of the confirmations received from mobile devices 110. When the quantity of confirmations received is less than a particular quantity (e.g., 2 or the quantity of people required for the available coupon), catch-up server 120 may generate and transmit, to mobile devices 110, update(s) that indicate that not enough people have provided confirmations for the available coupon. When the quantity of confirmations received is equal to or greater than the particular quantity, catch-up server 120 may generate and transmit, to mobile devices 110, updates that include identifiers of users in the group that have provided confirmation (e.g., confirmed participation in the activity) to catch-up service 120 via mobile devices 110.

Thereafter, the two or more users of mobile devices 110 may use mobile devices 110 to retract their confirmations. Catch-up server 120 may transmit new updates based on the retractions and/or based on new confirmations from other users in the group. Catch-up server 120 may also update calendars, which are accessed via mobile devices 110, of users who have confirmed by adding an entry for the activity in the calendars.

In one implementation, after the coupon is used by the confirmed users, a computer device of the venue may transmit usage information to catch-up server 120. The usage information may identify the available coupon and/or the confirmed users. Thereafter, catch-up server 120 may transmit a message to mobile devices 110 of the confirmed users to thank the users for utilizing the coupon. Additionally, or alternatively, one or more of the confirmed users may use mobile devices 110, and/or other computing devices, to rate the venue and/or an overall experience at the venue by one of the confirmed user and/or all of the confirmed users. Catch-up server 120 may use the ratings for ratings information, for the venue, in the future, as described above with reference to block 540.

Figure 6:
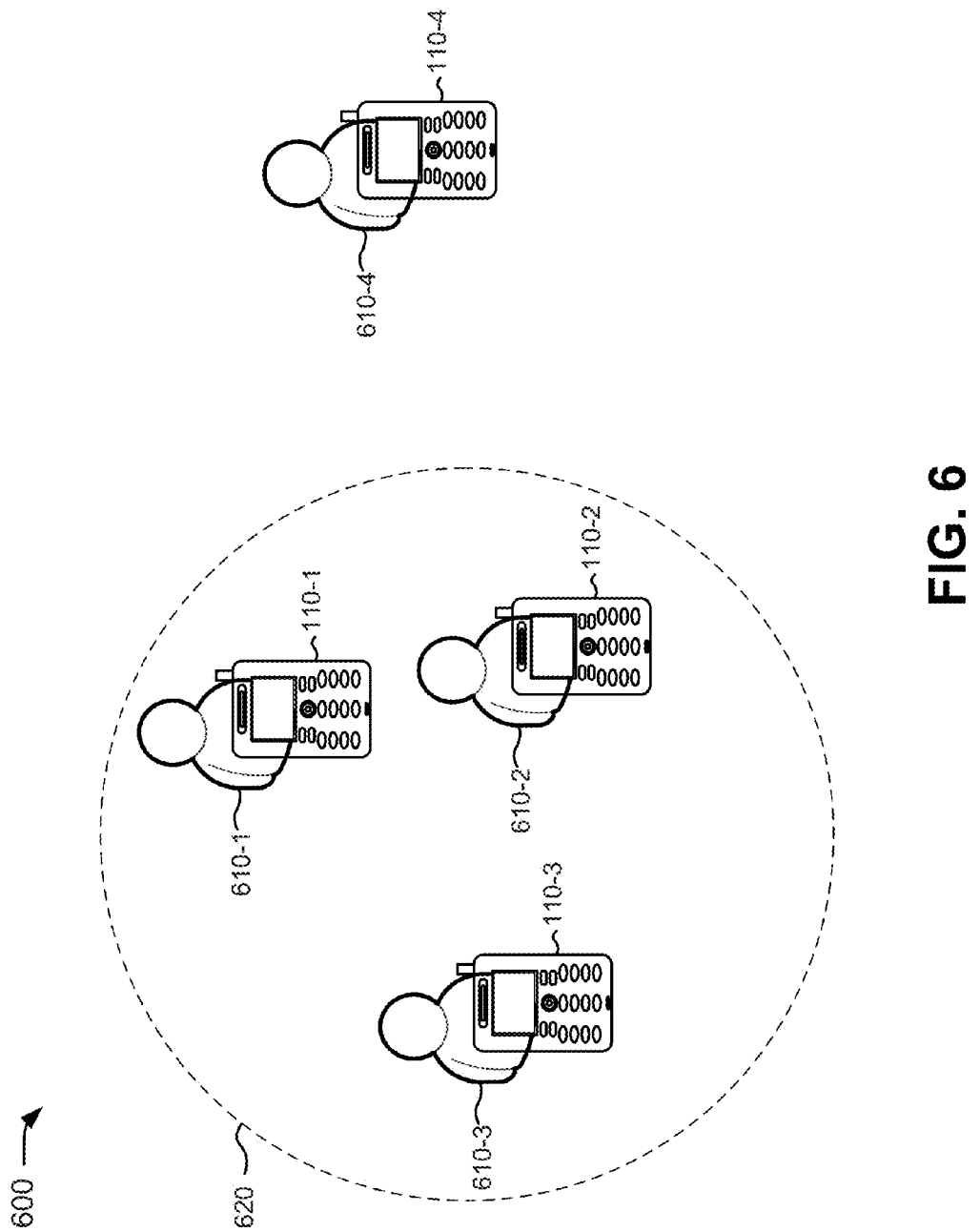
FIG. 6 is a diagram that illustrates an example of providing coupons.

FIG. 6 is a diagram that illustrates an example 600 of providing coupons. Assume that a user 610-1 of mobile device 110-1, a user 610-2 of mobile device 110-2, a user 610-3 of mobile device 110-3, and a user 610-4 of mobile device 110-4 are registered for a catch-up service. Further assume that, when registering, user 610-1 indicated an interest for coupons offered by restaurants and organized a group, which includes user 610-1, user 610-2, user 610-3, and user 610-4. Also assume that profiles of user 610-1, user 610-2, and user 610-4 indicate a selection of the preference for coupons offered by restaurants and that a profile of user 610-3 does not indicate the selection of the preference for coupons offered by restaurants.

Assume that user 610-1, while carrying mobile device 110-1, enters a geographic area 620 (e.g., Washington, D.C.). Catch-up server 120 may determine that mobile device 110-1 is within geographic area 620. Catch-up server 120 may identify one or more coupons that are associated with geographic area 620. Assume that catch-up server 120 identifies an available coupon for a group dinner at a Mexican restaurant that is located within geographic area 620. Catch-up server 120 may match the available coupon to user 610-1 because the profile of user 610-1 indicates the selection of the preference for coupons offered by restaurants. Catch-up server 120 may also determine that user 610-2 is within the group organized by user 610-1, that user 610-2 is within geographic area 620, and that the profile of user 610-2 indicates the selection of the preference for coupons offered by restaurants. Catch-up server 120 may determine that user 610-3 is within the group and is within geographic area 620, but that the profile of user 610-3 does not indicate the selection of the preference for coupons offered by restaurants. Catch-up server 120 may determine that user 610-4 is within the group and that the profile of user 610-4 indicates the selection of the preference for coupons offered by restaurants, but that mobile device 110-4 of user 610-4 is not within geographic area 620. Accordingly, catch-up server 120 may transmit the offer for the available coupon only to mobile device 110-1 of user 610-1 and to mobile device 110-2 of user 610-2. The offer may include information about the available coupon, and may indicate that the available coupon is being provided to user 610-1 and user 610-2 to meet up for dinner since user 610-1 and user 610-2 are both currently located within geographic area 620.

As a result, user 610-1 and user 610-2, who traveled to locations within geographic area 620, are able to take advantage of the available coupon together after being notified about the available coupon via their mobile devices (i.e., mobile device 110-1 and mobile device 110-2, respectively).

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   transmitting, from a server device, multiple preference options to a first mobile device of a first user of a group of users and to a second mobile device of a group of users, wherein the multiple preference options include:
   a type of service or product,
   a quantity of people; and
   a period of time;
   receiving, at the server device from the first user via the first mobile device, the first user's selection of one or more of the multiple preference options;

receiving, at the server device from the second user via the second mobile device, the second user's selection of one or more of the multiple preference options;
receiving, by the server device, a particular coupon that is available via one or more coupon services;
determining, by the server device, a first location of the first mobile device of the first user of the group of users;
determining, by the server device, a second location of the second mobile device of the second user of the group of users,
where the first location and the second location are within a particular geographic area;
matching, by the server device, the particular coupon to the group of users based on the particular geographic area and the selections of the one or more of the multiple preference options of the first user and the second user, where the particular coupon is for a service at a venue within the particular geographic area; and
transmitting, by the server device, information associated with the particular coupon to the first mobile device and the second mobile device.

2. The method of claim 1, further comprising:
determining logistics information associated with the particular coupon,
wherein the information associated with the particular coupon comprises the logistics information.

3. The method of claim 2, wherein the logistics information comprises one or more of:
first directions from the first location to the venue,
second directions from the second location to the venue,
information about weather expected at the venue when the service is provided, or
information about transportation that is available to the venue.

4. The method of claim 1, wherein the information associated with the particular coupon comprises one or more of:
information identifying a discount or terms associated with the particular coupon,
information identifying a period of time associated with the particular coupon,
an identifier of the venue,
an identifier of the first user,
an identifier of the second user, or
information identifying a type of the service.

5. The method of claim 1, further comprising:
receiving one or more confirmations,
wherein the one or more confirmations comprise at least one of:
a first confirmation from the first mobile device, or
a second confirmation from the second mobile device;
determining a quantity of the one or more confirmations;
transmitting, to the first mobile device and the second mobile device, first updates that indicate that not enough confirmations have been received for the particular coupon when the quantity of the one or more confirmations is less than a particular quantity indicated for the particular coupon; and
transmitting, to the first mobile device and the second mobile device, second updates that include identifiers of users, in the group, who have confirmed participation in an activity associated with the particular coupon when the quantity of the one or more confirmations is equal to or greater than the particular quantity.

6. The method of claim 1, further comprising:
receiving a first confirmation from the first mobile device;
receiving a second confirmation from the second mobile device;
generating, based on the first confirmation and the second information, a first update that indicates that the first user and the second user have confirmed participation in an activity associated with the particular coupon;
transmitting the first update to the first mobile device and the second mobile device;
receiving a retraction of the first confirmation from the first mobile device;
generating, based on the retraction of the first confirmation, a second update that indicates that not enough people are confirmed for the activity associated with the particular coupon; and
transmitting the second update to the second mobile device.

7. The method of claim 1, wherein matching the particular coupon to the group of users comprises:
determining the particular geographic area associated with the particular coupon,
determining a type of the service associated with the particular coupon,
determining that a first condition is satisfied when the first location and the second location are within particular geographic area,
determining that a second condition is satisfied when the selections of the one or more of the multiple preference options of the first user and the second user match the type of service, and
matching the particular coupon to the group of users when the first condition and the second condition are satisfied.

8. A server device comprising:
a memory configured to store:
a plurality of coupons for services or products at a plurality of venues;
a processor configured to:
cause multiple preference options to be transmitted to a first mobile device of a first user of a group of users and to a second mobile device of a second user of a group of users, wherein the multiple preference options include:
a type of service or product,
a quantity of people; and
a period of time;
receive, from the first user via the first mobile device, the first user's selection of one or more of the multiple preference options,
receive, from the second user via the second mobile device, the second user's selection of one or more of the multiple preference options,
receive, from the first mobile device of the first user of the group of users, information identifying a first location of the first mobile device,
receive, from the second mobile device of the second user of the group of users, information identifying a second location of the second mobile device,
determine a geographic area of a venue, of the plurality of venues, associated with a coupon, of the plurality of coupons,
match the coupon to the group of users when the first location and the second location are within the geographic area and based on the selections of the one or more of the multiple preference options of the first user and the second user, and
transmit information associated with the matched coupon to the first mobile device and the second mobile device.

9. The device of claim 8, where the processor is further configured to:
  receive, from the first mobile device, a first confirmation that indicates that the first user confirmed participation in an activity associated with the matched coupon,
  receive, from the second mobile device, a second confirmation that indicates that the second user confirmed participation in the activity, and
  transmit, to the first mobile device and the second mobile device, update information associated with the first confirmation and the second confirmation.

10. The device of claim 8,
  wherein the group of users further comprises a third user of a third mobile device,
  wherein the processor is further configured to:
    receive, from the third mobile device, information identifying a third location of the third mobile device,
    determine whether the third location is within the geographic area, and
    transmit the information associated with the matched coupon to the third mobile device only when the third location is within the geographic area.

11. The device of claim 8, wherein the information associated with the matched coupon comprises one or more of:
  information identifying a discount or terms associated with the matched coupon,
  information identifying a period of time associated with the matched coupon,
  an identifier of the venue,
  an identifier of the first user,
  an identifier of the second user, or
  information identifying the particular type of the service.

12. The device of claim 8, wherein the processor is further to:
  receive, from a computer device associated with the venue, usage information indicating that the first user and the second user used the matched coupon at the venue.

13. One or more non-transitory computer-readable media comprising:
  instructions which, when executed by one or more processors of a computing device, cause the one or more processors to:
    cause multiple preference options to be transmitted to a first mobile device of a first user of a group of users and to a second mobile device of a second user of a group of users, wherein the multiple preference options include:
      a type of service or product,
      a quantity of people; and
      a period of time;
    receive, from the first user via the first mobile device, the first user's selection of one or more of the multiple preference options,
    receive, from the second user via the second mobile device, the second user's selection of one or more of the multiple preference options,
    receive a particular coupon that is available via one or more coupon services,
    receive, from the first mobile device of the first user of the group of users, information identifying a first location of the first mobile device,
    receive, from the second mobile device of the second user of the group of users, information identifying a second location of the second mobile device,
    determine a geographic area of a venue associated with the particular coupon,
    match the particular coupon to the group of users when the first location and the second location are within the geographic area and based on the selections of the one or more of the multiple preference options of the first user and the second user, and
    transmit information associated with the matched coupon to the first mobile device and the second mobile device.

14. The media of claim 13,
  wherein the group of users further comprises a third user of a third mobile device, and
  wherein the instructions further cause the one or more processors to:
    determine whether a third location of the third mobile device is within the geographic area, and
    transmit the information associated with the matched coupon to the third mobile device only when the third location is within the geographic area and third preferences, of the third user, indicate preferences for coupons for the type of the service associated with the coupon.

15. The media of claim 13, wherein the information associated with the matched coupon comprises one or more of:
  information identifying a discount or terms associated with the coupon,
  information identifying a period of time associated with the coupon,
  an identifier of the venue,
  an identifier of the first user,
  an identifier of the second user, or
  information identifying the type of the service.

16. The media of claim 13,
  wherein the instructions further cause the one or more processors to:
    determine logistics information for the matched coupon,
  where the information associated with the matched coupon comprises the logistics information, and
  wherein the logistics information comprises one or more of:
    first directions from the first location to the venue,
    second directions from the second location to the venue,
    information about weather expected at the venue when the service is provided, or
    information about transportation that is available to the venue.

17. The media of claim 13,
  wherein the instructions further cause the one or more processors to:
    receive one or more confirmations from at least one of the first mobile device or the second mobile device,
    determine a quantity of the one or more confirmations,
    transmit, to the first mobile device and the second mobile device, first updates that indicate that not enough confirmations have been received for the coupon when the quantity of the one or more confirmations is less than a particular quantity required for the coupon; and
    transmit, to the first mobile device and the second mobile device, second updates that include two or more identifiers of users when the quantity of the one or more confirmations is equal to or greater than the particular quantity,
  wherein the two or more identifiers comprise a first identifier of the first user when one of the one or more confirmations is received from the first mobile device, and wherein the two or more identifiers comprise a second identifier of the second user when one of the one or more confirmations is received from the second mobile device.

18. The method of claim 1, further comprising:
retrieving contacts of the first user from the first mobile device, or from one or more social networking services, wherein the contacts comprises a first plurality of users that includes the second user; and
identifying the group of users based on the retrieved contacts of the first user.

19. The method of claim 18, further comprising:
providing, from the server device to the first mobile device, an interface to organize the retrieved contacts of the first user into the group of users; and
receiving, from the first user via the interface, information for organizing the retrieved contacts of the first user into the group of users.

20. The server device of claim 8, wherein the processor is further configured to:
cause contacts of the first user to be retrieved from the first mobile device, or from one or more social networking services, wherein the contacts comprises a first plurality of users that includes the second user; and
identify the group of users based on the retrieved contacts of the first user.

21. The server device of claim 20, wherein the processor is further configured to:
provide, to the first mobile device, an interface to organize the retrieved contacts of the first user into the group of users; and
receive, from the first user via the interface, information for organizing the retrieved contacts of the first user into the group of users.

22. The media of claim 13, wherein the instructions further cause the one or more processors to:
cause contacts of the first user to be retrieved from the first mobile device, or from one or more social networking services, wherein the contacts comprises a first plurality of users that includes the second user; and
identify the group of users based on the retrieved contacts of the first user.

23. The media of claim 22, wherein the instructions further cause the one or more processors to:
provide, to the first mobile device, an interface to organize the retrieved contacts of the first user into the group of users; and
receive, from the first user via the interface, information for organizing the retrieved contacts of the first user into the group of users.

* * * * *